S. SCHIPPERT.
COMBINED GRADUATED MEASURE AND FUNNEL.

No. 195,846. Patented Oct. 2, 1877.

Witnesses:—
Wm H. Rowe
Edw. J. Stillwagen

Inventor:—
Simon Schippert,
by C. H. Rowe,
Atty.

UNITED STATES PATENT OFFICE.

SIMON SCHIPPERT, OF BURLINGTON, IOWA.

IMPROVEMENT IN COMBINED GRADUATED MEASURE AND FUNNEL.

Specification forming part of Letters Patent No. 195,846, dated October 2, 1877; application filed June 25, 1877.

*To all whom it may concern:*

Be it known that I, SIMON SCHIPPERT, of the city of Burlington, in the county of Des Moines and State of Iowa, have invented certain new and useful Improvements in Combined Graduated Measuring Cups and Funnels, of which the following is a specification:

My invention relates to that class of measuring-cups provided with a funnel-spout at the bottom, that is closed or opened by a valve, in such manner that the liquids may be drawn from one vessel and emptied into bottles or vessels having a small opening through which to receive them; and the object of my invention is to provide a means of gaging or measuring a smaller quantity of liquid than is required to fill the measuring-cup, and also to secure a simple and effectual device for operating the valve to open or close the bottom of the cup and funnel, as hereinafter described.

Figure 1:
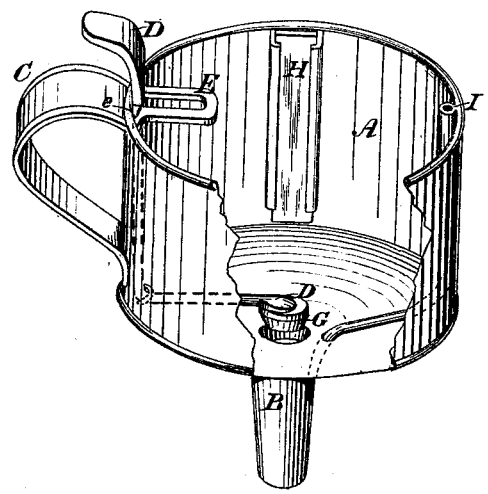
Figure 2:
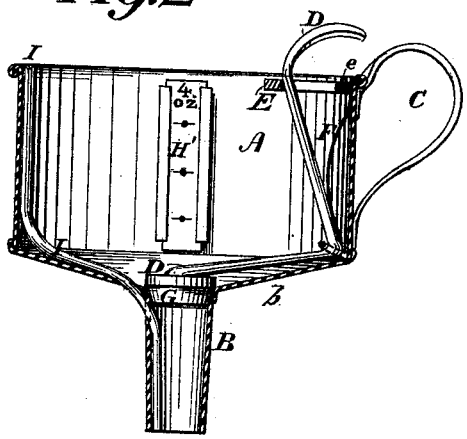

In the accompanying drawings, Figure 1 is a perspective view of the cup, showing the valve raised to discharge the contents of the cup; Fig. 2, a vertical section through the cup and funnel, showing the valve closed.

A cup, A, with the interior surface of the bottom $b$ of concave form, is provided with a funnel, tube, or spout, B, secured to and communicating with it and the mouth of the tube, and a suitable handle, C, is attached to the cup, in the usual way. A bell-crank lever, D, is pivoted or hinged in a suitable manner to the interior of the cup, so that the longer arm may be arranged near the inner side of the cup, and the shorter arm project radially directly over the bottom of the cup to the opening of the funnel-tube. The shorter arm is provided at its end with a conical valve, G, of rubber or other flexible material.

By covering the valve a secure jointure may be effected; and it may be more readily removed by the action of the lever.

The lever D is also arranged relatively to the handle of the cup, its upper end being bent over the handle within convenient reach of the thumb, as shown in Fig. 1.

A guide, E, attached to the interior of the cup, embraces the upper end of the lever D, and serves to hold it in position, and a spring-plate, F, attached to the lever, bears against the inner side of the cup, and serves to hold the valve closely into the mouth of the funnel-tube to hold the liquid in the cup until it is desired to empty it. A notch, $e$, in the guide E serves to hold the lever D back, and the valve open when desired.

A graduated metal plate is secured to the interior of the cup, upon which are marked lines, or dots, or notches, placed at suitable points to indicate the quantity of liquid in the cup when its surface shall be opposite such points.

A glass plate, H, may be placed in one side of the cup, through which the level of the liquid may be observed, and a graduated slide-plate, H', in the opposite side of a cup.

An air-vent tube, I, placed upon the inner side of the cup and funnel, permits the air to escape from the vessel while it is being filled.

By this means any quantity of liquid may be drawn from a cask or vessel and emptied into other vessels through small openings with one utensil, or various quantities of different liquids may be drawn into the graduated cup, and then deposited wholly or partially into another vessel or vessels.

The form of lever shown will enable the valve to be easily operated, and considerable force may be applied, because of the unequal length of the arms, to close or open the valve with but little effort.

I claim as my invention, and desire to secure by Letters Patent—

1. The combination, with the measuring cup and funnel, of the stop-valve secured to the end of a bell-crank lever, D, arranged and pivoted at the angle of the lever to the interior of the cup, as described, to be operated by the thumb in opening and closing the valve, as described.

2. The combination of the cup A, the funnel B, the stop-valve G, the vibrating bell-crank lever D, the guide and lock plate E, and the spring F, these parts being constructed, arranged, and operating in the manner and for the purpose described.

SIMON SCHIPPERT.

Witnesses:
JAMES H. BREMMERMAN,
GEO. H. LANE.